(12) United States Patent
Leyendecker

(10) Patent No.: US 7,602,819 B2
(45) Date of Patent: Oct. 13, 2009

(54) DEMULTIPLEXING DEVICES AND PROCESS FOR AT LEAST TWO TRANSPORT STREAMS AND A CORRESPONDING DIGITAL STREAM

(75) Inventor: Philippe Leyendecker, Chateaugiron (FR)

(73) Assignee: Thomson Licensing, Boulogne-Billancourt (FR)

( * ) Notice: Subject to any disclaimer, the term of this patent is extended or adjusted under 35 U.S.C. 154(b) by 778 days.

(21) Appl. No.: 10/220,656

(22) PCT Filed: Mar. 1, 2001

(86) PCT No.: PCT/EP01/02314

§ 371 (c)(1),
(2), (4) Date: Sep. 3, 2002

(87) PCT Pub. No.: WO01/65831

PCT Pub. Date: Sep. 7, 2001

(65) Prior Publication Data

US 2003/0031211 A1   Feb. 13, 2003

(30) Foreign Application Priority Data

Mar. 3, 2000  (EP) .................................. 00400622

(51) Int. Cl.
*H04J 3/04*   (2006.01)
(52) U.S. Cl. .................. 370/535; 370/389; 375/240.01; 386/46; 386/83; 386/95; 725/100; 725/131
(58) Field of Classification Search ................. 370/535, 370/352, 389; 375/240.01, 240.25; 386/46, 386/83, 95; 725/100, 131
See application file for complete search history.

(56) References Cited

U.S. PATENT DOCUMENTS 5,566,174 A   10/1996   Sato et al. ...................... 370/84
5,825,430 A   10/1998   Adolph et al. .............. 348/487

(Continued)

FOREIGN PATENT DOCUMENTS

EP     0 106 770 A1    4/1984

(Continued)

OTHER PUBLICATIONS

R.H.J. Bloks, "The IEEE-1394 High Speed Serial Bus", Philips Research Laboratories, Prof. Holstlaan 4, 5656 AA Eindhoven, The Netherlands, vol. 50, No. 1, 1996, pp. 209-216.

*Primary Examiner*—Ricky Ngo
*Assistant Examiner*—Chandrahas Patel
(74) *Attorney, Agent, or Firm*—Robert D. Shedd; Harvey D. Fried; Joel M. Fogelson

(57) ABSTRACT

The invention is related to a demultiplexing device and process for at least two transport streams. The demultiplexing device comprises at least one merging unit, receiving at least two of the transport streams and producing one merged stream comprising a merged arrangement of the originating packets. The merging unit comprises means for marking each packet with an identifier and to assign to it a given value for each received transport stream. The demultiplexing device also comprises at least one demultiplexer receiving and demultiplexing the merged stream produced by the merging unit corresponding to the demultiplexer. That demultiplexer filters the identifiers and determines thereby the received transport streams from which the corresponding packets are derived.

11 Claims, 3 Drawing Sheets

U.S. PATENT DOCUMENTS

| | | | | |
|---|---|---|---|---|
| 5,905,732 A | * | 5/1999 | Fimoff et al. | 370/516 |
| 6,035,037 A | * | 3/2000 | Chaney | 380/227 |
| 6,940,876 B1 | * | 9/2005 | Crinon | 370/535 |
| 7,023,992 B1 | * | 4/2006 | Kubota et al. | 380/210 |

FOREIGN PATENT DOCUMENTS

| | | |
|---|---|---|
| EP | 661 888 A2 | 7/1995 |
| EP | 661888 A2 * | 7/1995 |
| WO | 96/07267 | 3/1996 |
| WO | WO 97/28652 A | 8/1997 |
| WO | 98/16067 | 4/1998 |

\* cited by examiner

DEMULTIPLEXING DEVICES AND PROCESS FOR AT LEAST TWO TRANSPORT STREAMS AND A CORRESPONDING DIGITAL STREAM

This application claims the benefit under 35 U.S.C. §365 of International Application PCT/EP01/02314, filed Mar. 1, 2001, which claims the benefit of European Application No. 00400622.7, filed Mar. 3, 2000.

The present invention is related to a demultiplexing device and process for at least two transport streams or TS, as well as to associated applications.

BACKGROUND OF THE INVENTION

In emerging digital applications and especially in new generations of Set-Top-Boxes or Digital Television Sets, the presence of more than one digital front-ends enables new services to the end-customer. In particular, viewing one program while recording another one on a digital media is a very strong demand from end-customers, since that functionality was natural in the analogue world, with a TV set together with a VCR (Video Cassette Recorder).

This implies that the digital system be able to process two different transport streams, coming from the two digital front-ends. The immediate answer to that is to implement two demultiplexers in the system.

Now, most of the digital MPEG decoders today only support one transport stream input and demultiplexing.

BRIEF SUMMARY OF THE INVENTION

The present invention concerns a demultiplexing device for at least two transport streams, notably from respectively at least two front-ends, enabling the use of a number of demultiplexers that is lower than the number of transport streams.

The invention also relates to a corresponding demultiplexing process having the advantage above and to applications of the demultiplexing device and process.

It is further concerned with a digital TV receiver comprising a demultiplexing device according to the invention and to a digital stream able to be produced in such a demultiplexing device.

This is achieved by means of the demultiplexing device defined in claim 1 and the demultiplexing process defined in claim 10.

Indeed, a typical Transport Stream data rate is in the order of 40 to 60 Mb/s, while the Integrated Circuit (IC) technology currently in use allows for demultiplexers to run fast enough to process transport streams with data rates exceeding 100 Mb/s. So, it is taken advantage of the higher capacity of the demultiplexers to process two different and separate streams of about 40 to 60 Mb/s with a single demultiplexer. Namely, two incident streams are merged into a single one before being injected into a demultiplexer. This operation is performed in a merging unit.

An identifier is added to each incident packet to enable the demultiplexer to recognize to which original stream it belongs. This is useful since the same PIDs (for "Packet Identifiers") can be present in both (or more involved) streams.

The present invention is particularly appropriate for Set-Top-Boxes (e.g. stand-alone digital satellite, cable or terrestrial receivers/decoders) or Digital Television Sets (e.g. including the digital receiver/decoder functionality).

Preferably, the originating transport streams carry the same type of information, such as audio video data advantageously coded according to an MPEG standard, like for example MPEG2 or MPEG4. Thereby, the processing by the demultiplexing device can be more efficient.

Preferred embodiments of the demultiplexing device are defined in dependent claims 2 to 9.

Notably, one advantageous possibility is to use the "transport_priority_bit" which is located in the header of each transport packet, to mark each packet. This bit would be forced to "0" in all the packets coming from one stream and forced to "1" in all the packets coming from the other stream. The demultiplexer has thus to filter not only on the 13-bit PID, but also on the "transport_priority_bit". As that "transport_priority_bit" belongs to the same byte as the upper bits of the PID, it is very easy to modify the PID filter to extend the filtering to that bit (most of the current demultiplexers already support the filtering of that bit).

According to other embodiments, not implying the "transport_priority_bit", each packet coming out of the merging unit is preceded or followed by a "tag", which can be a number of bits showing which is the original stream that packet belonged to.

It is then interesting that the "tag" also carries a time stamp corresponding to the time at which the corresponding packet reached the merging unit, helping to implement solution B described below.

The process of merging two (or more) streams into a single one can be done in various ways. Some logic with a limited amount of memory is necessary to perform this operation. A typical algorithm is to have a FIFO memory for each incoming bit stream and each time a complete packet has arrived it is output to the demultiplexer. The size of the FIFO is typically two transport packets.

The two (or more) incident streams can have different bit rates. The frequency of the clock to output packets to the demultiplexer must be at least the sum of the frequencies of the two (or more) incident streams.

Typically, each of the incident streams has its own 27 MHz clock time base. The clock recovery is advantageously performed on the stream that is decoded and displayed directly. In variants, two (or more) independent 27 MHz clock recovery modules are implemented.

The following applies to each individual (for example 27 MHz) clock recovery. Several alternative approaches A, B and C are considered. It should be noted that they can be combined, insofar as some of them are used for a part of the merging units, and different ones for other merging units.

A—The PCR (for "Program Clock Reference") values are not modified and the local clock is sampled when the packet reaches the demultiplexer: packets carrying the PCR may have some jitter with regard to their theoretical arrival time. The clock recovery system has to absorb the jitter.

B—The local clock is sampled when the incident packet reaches the merging unit: no jitter is introduced.

C—The PCR values of the packets carrying PCR are modified according to the time spent in the merging unit.

According to a first implementation of the demultiplexing set, the merging circuitry is used with an external IC between the front-end delivering the TS and the back-end-IC performing the demultiplexing. According to a second implementation, the merging circuitry is embedded in the back-end IC, upstream from the demultiplexer.

The invention is particularly interesting for two transport streams. However, it is also applicable to three or more TS. Then, preferably, either all the TS are processed by means of a single merging unit and a single demultiplexer (DMX), or they are grouped by couples and processed by means of respective merging units and DMX, or both techniques are combined.

BRIEF DESCRIPTION OF THE DRAWINGS

The invention will be detailed and illustrated by means of the following non-limiting examples, with reference to the appended Figures, on which.

DETAILED DESCRIPTION OF THE INVENTION

On the figures, similar elements of various embodiments are denoted by the same references.

Figure 1:
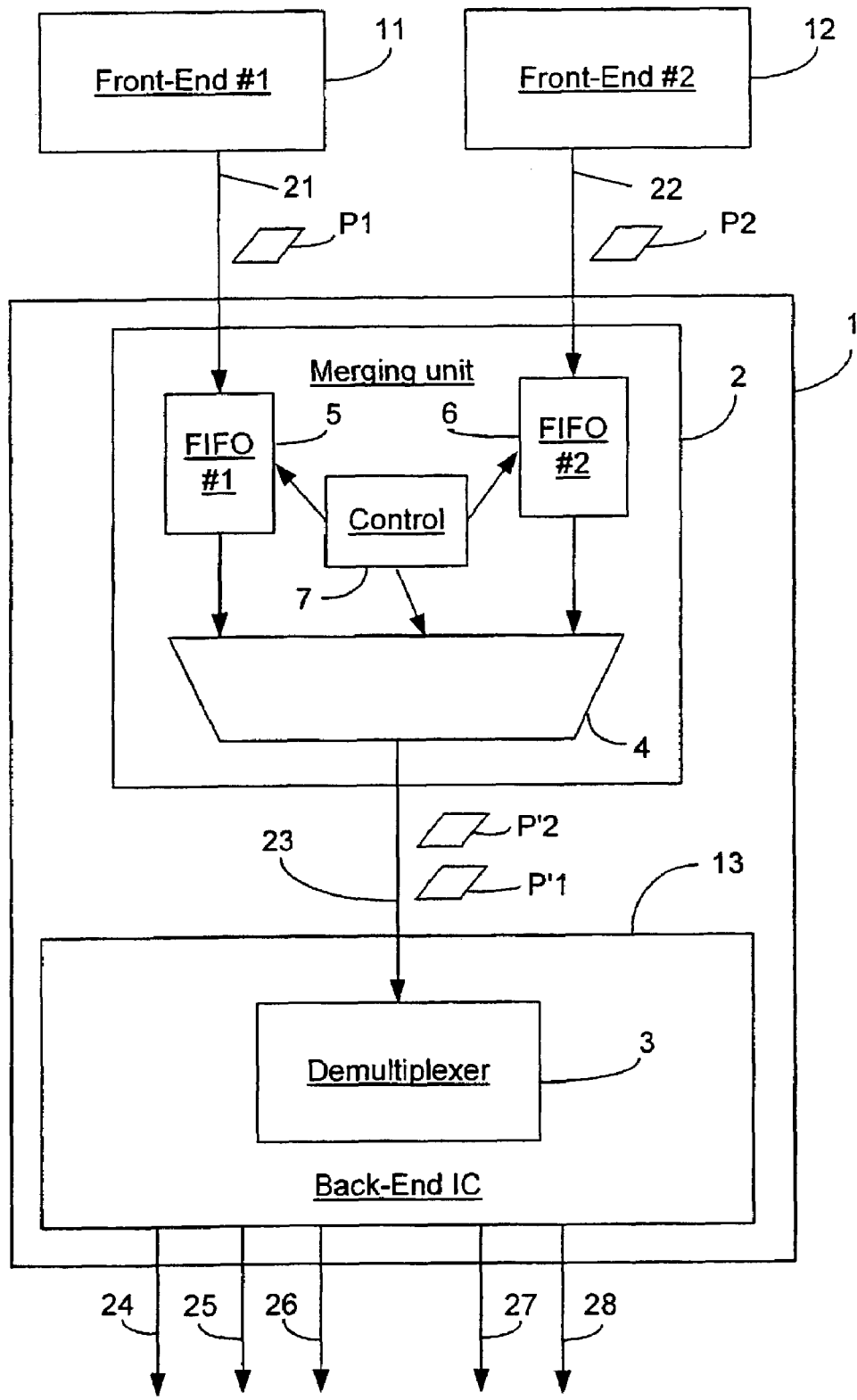
FIG. 1 represents a first embodiment of a demultiplexing device according to the invention, provided for two input transport streams.

A demultiplexing device 1 (FIG. 1), intended to be incorporated for example in a Set-Top-Box, is able to receive two input TS 21 and 22, respectively coming from two front-ends 11 and 12, and to produce output streams 24-28 at a back-end 13. Each of the streams 24-28 corresponds to a specific program of the TS 21 and 22. For example, the streams 24 to 26 are derived from TS 21 and the streams 27 and 28 from TS 22. In the represented example, the back-end 13 is constituted on an IC.

In a particular embodiment, the streams 24-28 are coded streams in the form of TS, the back-end 13 being coupled with a decoder and/or a storing support. The demultiplexing device 1 thus enables to select a particular program to be displayed on screen after decoding and another program to be stored simultaneously on a hard disk drive (HDD) in a compressed form. In another embodiment, a decoder is incorporated in the back-end 13, so that the streams 24-28 carry decoded programs.

The demultiplexing device 1 comprises a merging unit 2 for merging the input TS 21 and 22 and producing a merged TS 23, and a demultiplexer (DMX) 3 for demultiplexing the latter as a whole.

The merging unit 2 is intended:
  to receive the incoming TS 21 and 22 having respectively packets P1 and P2,
  to mark each of those packets P1 and P2 with an identifier and to assign to the identifier one of two values respectively associated with TS 21 and TS 22,
  and to produce the merged TS 23 comprising a merged arrangement of packets P'1 and P'2 respectively derived from the packets P1 and P2 of the TS 21 and 22, after marking.

In the represented embodiment, the merging unit 2 is separated from the back-end 13 IC, and is incorporated on another specific IC. In a variant, it is incorporated in the back-end 13 IC.

The merging unit 2 essentially comprises two FIFO memories 5 and 6 respectively intended to receive the incoming TS 21 and 22, a merging block 4 including marking means, and a control unit 7 for controlling the elements of the merging unit 2. The size of each of the FIFO memories 5 and 6 is for example twice the size of the packets P1 or P2. The control unit 7 provides that a packet is output from any of the memories 5 and 6 only when, and as soon as, a complete packet has already arrived therein.

The merging block 4 marks the received packets P1 and P2 and delivers the corresponding packets P'1 and P'2, in the order in which it receives the incoming packets P1 and P2 from the FIFO memories 5 and 6. Namely, the packets of both input TS 21 and 22 are arranged in their reception order in the merged TS 23, and are not sorted. As a variant, the packets P'1 and P'2 are delivered according not only to their reception order, but also to given criteria. For example, priority levels given by a user for the respective TS 21 and 22 (in fact for the corresponding wished programs) are used, each packet being associated with a coefficient resulting from a weighting of the arrival order and from the priority level.

Figure 2:
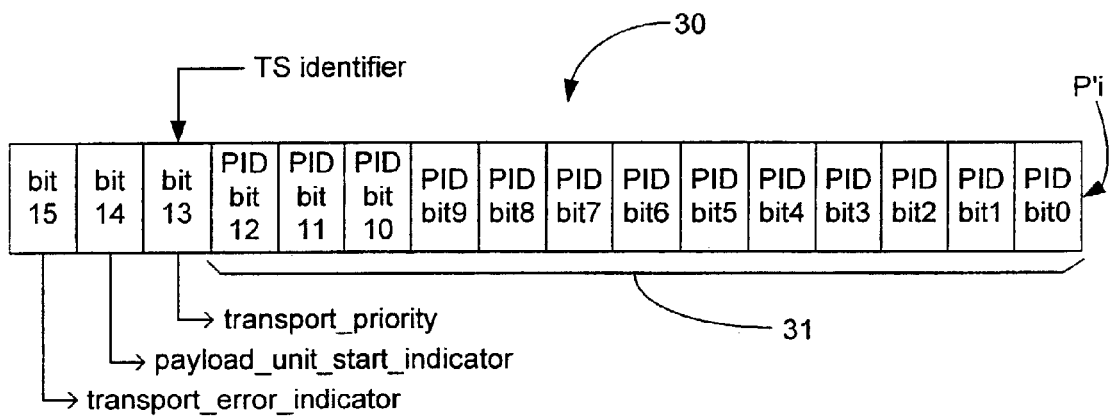
FIG. 2 shows a header comprising a transport stream identifier, obtained through a first embodiment of marking means used in the demultiplexing device of FIG. 1.

In a first embodiment of the marking means of the merging block 4 (FIG. 2), they are provided for forcing the value of a specific bit already present in each of the packets P1 and P2. Namely, each of the packets Pi (i=1, 2) comprising a header 30, which includes successively twelve bits for the packet PID 31, followed by a transport_priority_bit bit13, a payload_unit_start_indicator bit14 and a transport_error_indicator bit15, the marking means are providing for:
  forcing the transport_priority_bit bit13 to 0 for one of the received TS, for example TS 21,
  and forcing the transport_priority_bit bit13 to 1 for the other received TS, namely TS 22.

Figure 3:
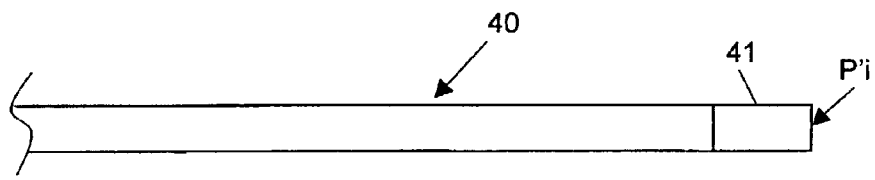
FIG. 3 shows a header comprising a transport stream identifier, obtained through a second embodiment of marking means used in the demultiplexing device of FIG. 1.

In a second embodiment of the marking means of the merging block 4 (FIG. 3), they are provided for adding to each of the packets P1 and P2 a tag 41 comprising the TS identifier. In the shown example, that tag 41 is arranged in front of the heading part 40 of the packet Pi. In a variant, that tag is arranged at the end of the packet Pi.

The DMX 3, incorporated in the back-end 13, is intended to receive the merged TS 23 and to demultiplex it, by:
  filtering the identifiers of the received packets P'1 or P'2, so as to determine the input TS 21 or 22 which each of the packets belongs to,
  and determining from the PID of that received packet, the program which the packet relates to.

Then, the demultiplexer 3 is able to produce the output streams 24-28 corresponding unambiguously to different programs. Indeed, even if a same PID is used in TS 21 and TS 22 for respectively two programs, the DMX 3 identifies also the originating TS 21 or 22. Moreover, the mere DMX 3 is thereby enough for demultiplexing at the same time both TS 21 and 22.

Figures 4A, 4B, 4C:
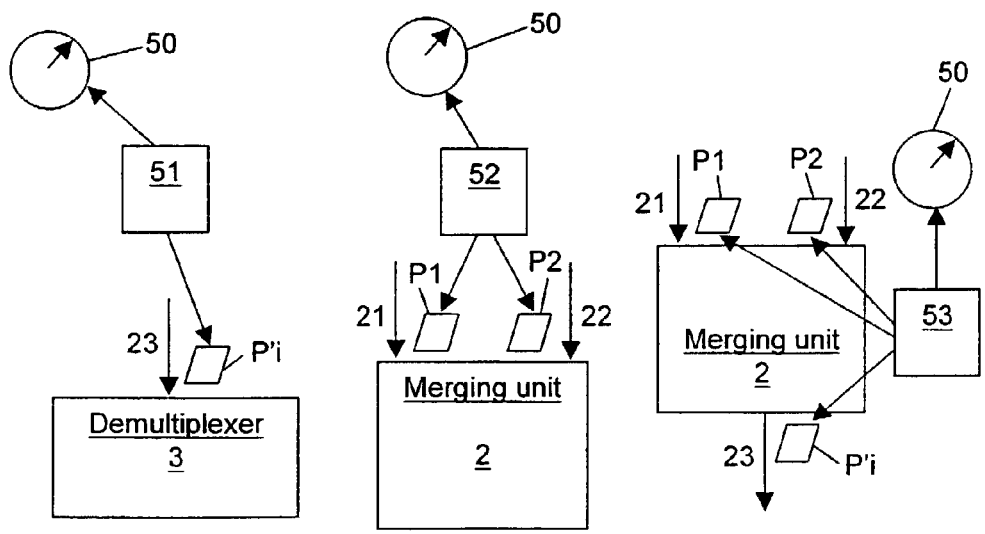
FIG. 4A is a schematic representation of a first embodiment of synchronizing means, used in the demultiplexing device of FIG. 1.
FIG. 4B is a schematic representation of a second embodiment of synchronizing means, used in the demultiplexing device of FIG. 1.
FIG. 4C is a schematic representation of a third embodiment of synchronizing means, used in the demultiplexing device of FIG. 1.

Clock recovery will be now detailed in reference to three embodiments represented on FIGS. 4A, 4B and 4C. In the three embodiments, it is made use of a reference clock 50 for obtaining reference time information. The clock 50 is for example locked on a program that is decoded and displayed directly. According to the first embodiment (FIG. 4A), each of the TS 21 and 22 being associated with a local clock, the demultiplexing device 1 comprises sampling means 51 intended to sample that local clock when the packets P'i of the merged stream 23 reach the DMX 3.

According to the second embodiment (FIG. 4B), each of the TS 21 and 22 being associated with a local clock, the demultiplexing device 1 comprises sampling means 52 intended to sample that local clock when the packets Pi of the input streams 21 and 22 reach the merging unit 2. This clock recovery embodiment is advantageously combined with the addition of a tag carrying the TS identifier to each of the packets Pi. That tag then also carries a time stamp corresponding to the time at which that packet reaches the merging unit 2.

According to the third embodiment (FIG. 4C), some of the packets Pi of the input TS 21 and 22 carrying PCRs, the demultiplexing device 1 comprises PCR modifying means 53, intended to modify those PCR values according to the time spent by the corresponding packets in the merging unit 2.

A demultiplexing device 1 (FIG. 1), intended to be incorporated for example in a Set-Top-Box, is able to receive two input TS 21 and 22, respectively coming from two front-ends 11 and 12, and to produce output streams 24-28 at a back-end 13. Each of the streams 24-28 corresponds to a specific program. In the represented example, the back-end 13 is constituted on an IC.

Figure 5:
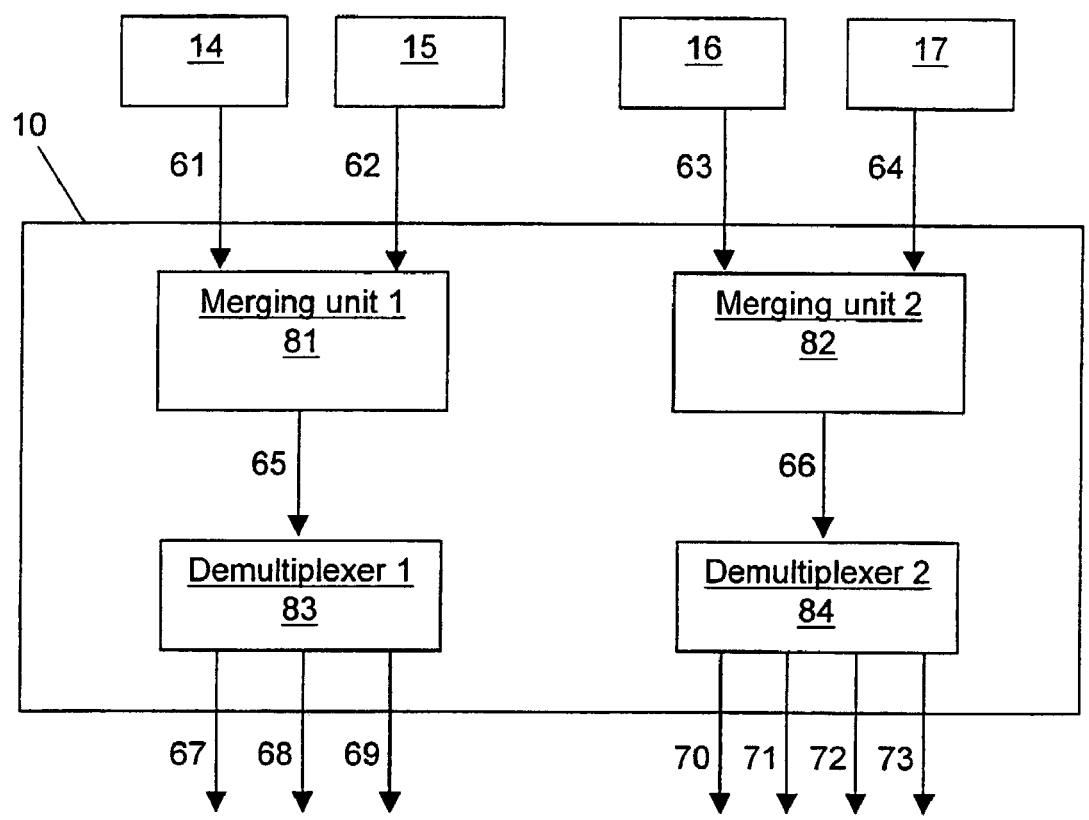
FIG. 5 shows a second embodiment of a demultiplexing device according to the invention, provided for four input transport streams.

In another embodiment of a demultiplexing device, referred to by 10 (FIG. 5), the latter is able to receive four input TS 61 to 64 respectively coming from four front-ends 14 to 17, and to produce output streams 67 to 73. By contrast with the demultiplexing device 1 (FIG. 1), the demultiplexing device 10 comprises two merging units 81 and 82 and two respectively associated demultiplexers 83 and 84.

The merging unit 81 is intended to receive the TS 61 and 62 from the front-ends 14 and 15 and to produce a merged TS 65, in a similar way as in the previous embodiment. Also, DMX 83 is intended to receive the merged stream 65 and to demultiplex it as a whole, so as to produce the output streams 67 to 69 respectively associated with programs carried by the input TS 61 and 62. Likewise, the merging unit 82 is intended to receive the TS 63 and 64 from the front-ends 16 and 17 and to produce a merged TS 66, while DMX 84 is intended to demultiplex that merged TS 66 and to produce the output streams 70 to 73. The demultiplexing device 10 is thus shared in two parts (merging unit 81 and DMX 83 on one hand, merging unit 82 and DMX 84 on the other hand), each of them having the features of any of the embodiments described above for the demultiplexing device 1.

In variants, the demultiplexing device comprises a merging unit, which is able to merge more than two TS, for example three or four TS. This involves however that the associated demultiplexer has the capacity to demultiplex in due time the obtained merged stream (high speed processing).

What is claimed is:

1. A demultiplexing device comprising:
    at least one merging unit receives at least two transport streams wherein
    when said at least two transport streams are composed of packets using the same packet identifiers for packets;
        said at least one merging unit produces one merged stream comprising a merged arrangement of the packets from said received at least two transport streams;
        said at least one merging unit additionally comprising a means for marking each of said packets in said merged stream with an identifier and to assign to said identifier a value corresponding to each received transport streams; and
    at least one demultiplexer corresponding to said at least one merging unit where each of said demultiplexers is capable of receiving and demultiplexing the merged stream produced by the at least one merging unit corresponding to said demultiplexer said demultiplexer being able to filter said identifiers as to determine from said identifiers the received transport stream from which the corresponding packet originates from.

2. A demultiplexing device according to claim 1, wherein the number of transport streams is equal to two, and each of said packets has a header comprising a transport priority bit and
    said means for marking is a means for forcing said transport priority bit to 0 for one of said received transport streams and to 1 for the other received transport stream.

3. A demultiplexing device according to claim 1, wherein said means for marking is a means for adding to each of said packets a tag which comprises said identifier.

4. A demultiplexing device according to claim 3, wherein said tag also carries a time stamp referring to the times at which the corresponding packet reaches the corresponding merging unit.

5. A demultiplexing device according to claim 1, wherein that each of said merging units comprises at least two First In First Out (FIFOs) respectively intended to receive each of said received transport streams and to release said transport stream as soon as a complete packet of said transport stream has arrived.

6. A demultiplexing device according to claim 5, wherein each of said FIFOs has a size which amounts to two packets of the transport stream corresponding to said FIFO.

7. A demultiplexing device according to claim 1, wherein that at least one of said received transport streams is associated with a local clock, said demultiplexing device comprises means for sampling said local clock when the packets of the corresponding merged stream, which are derived from said received transport streams reach the corresponding demultiplexer.

8. A demultiplexing device according to claim 1, wherein at least one of said received transport streams is associated with a local clock, said demultiplexing device comprises means for sampling said local clock when the packets of said transport stream reach the corresponding merging unit.

9. A demultiplexing device according to claim 1, wherein at least one of the packets of said received transport streams being associated with Program Reference Clock (PCR) values, said demultiplexing device comprises means for modifying said PCR values according to the time spent by said transport streams packets in the corresponding merging unit.

10. A demultiplexing device according to claim 1, wherein said demultiplexing device is comprised in a Digital Television.

11. A demultiplexing process for processing at least two transport streams wherein said process comprises the steps of:
    receiving at least two of said transport streams comprising packets wherein when said at least two transport streams are using the same packet identifiers for packets said at least two transport streams are supplied to at least one merging unit which produces one merged stream comprising a merged arrangement of the packets of said received at said least two transport, wherein each of said packets in said one merged stream are marked with an identifier and assigning to said identifier a given value for each of said received transport streams; and
    demultiplexing the merged stream produced by each of said merging units by means of a corresponding demultiplexer while filtering said identifiers and determining thereby from said identifiers the transport streams from which the corresponding packets are derived.

* * * * *

UNITED STATES PATENT AND TRADEMARK OFFICE
CERTIFICATE OF CORRECTION

PATENT NO. : 7,602,819 B2 Page 1 of 1
APPLICATION NO. : 10/220656
DATED : October 13, 2009
INVENTOR(S) : Philippe Leyendecker It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1542 days.

Signed and Sealed this

Fifth Day of October, 2010

David J. Kappos
*Director of the United States Patent and Trademark Office*